United States Patent Office 3,833,731
Patented Sept. 3, 1974

3,833,731
DIHALOMETHYLGLUTARONITRILES USED AS ANTIBACTERIAL AND ANTIFUNGAL AGENTS
Nathaniel Grier, Englewood, and Seymour J. Lederer, Fair Lawn, N.J., assignors to Merck & Co., Inc., Rahway, N.J.
No Drawing. Filed Dec. 28, 1970, Ser. No. 102,197
Int. Cl. A01n 9/06, 9/20
U.S. Cl. 424—304
1 Claim

ABSTRACT OF THE DISCLOSURE 2-halo-2-halomethylglutaronitriles are useful in agricultural and in industrial applications as fungicidal and bactericidal agents.

---

This invention relates to new compositions of matter useful in agricultural and in industrial applications as antimicrobial agents (fungicidal, bactericidal and algicidal). More particularly, the instant invention relates to antimicrobial compositions containing, as the essential active ingredient, a 2-halo-2-halomethylglutaronitrile and to processes for employing such compositions as antimicrobials in agricultural and industrial applications.

Fields of technology adversely adected by fungal, bacterial and algal growth are many and include, for example, the paint, wood, textile, cosmetic, leather, tobacco, fur, rope, paper, pulp, plastics, fuel, oil, and rubber industries. Fungicides and bactericides are also utilized for agricultural applications such as for instance, in preventing or minimizing the growth of harmful fungi and/or bacteria on plants, trees, fruits, seeds or soil. The instant invention is based upon the discovery that the 2-halo-2-halomethylglutaronitriles described hereinafter are effective antimicrobials when employed in these and in other applications.

As used in the description of this invention, the expressions "antimicrobial," "fungicide," "bactericide," "algicide" and the like are intended to encompass control of fungi, bacteria (both aerobic and anaerobic) and algae broadly and to include the killing as well as inhibiting the growth of such organisms.

In its composition aspect, therefore, the instance invention may be described as residing in the concept of antimicrobial compositions containing as the essential active ingredient an antimicrobially effective quantity of a 2-halo-2-halomethylglutaronitrile of the formula:

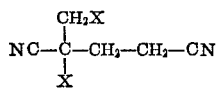

wherein X is a member selected from the group consisting of chlorine and bromine. It is contemplated that antimicrobial formulations containing an effective amount of such 2-halo-2-halomethylglutaronitriles will be employed as antimicrobial agents in industrial and agricultural applications.

As noted above, the instant invention is based upon the discovery that the 2-halo-2-halomethylglutaronitriles described above are effective in controlling the growth of bacterial, fungi and algae in a variety of industrial and agricultural applications. It has been found, for example, that these compounds are effective antimicrobials for the destruction or control of soil fungi and bacteria and for the protection of seeds, bulbs and plants. Also they are effective algicides in the treatment of pools and ponds, cooling water systems and the like. The utility of the 2-halo-2-halomethylglutaronitriles of this invention is shown not only by their activity against bacteria and fungi responsible for stunting growth, and even destruction of many types of crop-producing plants, but also for those causing degradation and deterioration of many types of industrial products including, for example, paper, leather, textiles, aqueous systems such as adhesives, resins, drilling fluids, pigment dispersions and latex paints and oleoresinous coatings whose films are particularly vulnerable to the destructive action of fungi. The large economic losses encountered in paper-making operations caused by the accumulation of bacterial and fungal slimes in various parts of the system can be eliminated to a significant extent by use of the compounds described herein.

The antimicrobial activity of the compounds described above has been confirmed using standard laboratory techniques. They have been found effective, for example, in inhibiting bacteria including *Aerobacter sp.* such as *A. aerogenes*, *Bacillus sp.* such as *B. mycoides* *Pseudomonas sp.* such as *P. aeruginosa*, *Staphylococcus sp.* such as *S. aureus*, *Escherichia sp.* such as *E. coli*, *Cellulomonas sp.* such as *C. biazotea*, *Proteus sp.* such as *P. mirabilis* and sulfate reducing bacteria including *Desulfovibrio sp.*, such as *D. desulfuricans*. They have been found effective also against fungi including *Rhodotorula sp.*, *Alternaria sp.*, *Aspergillus sp.* such as *A. niger*, *Pullularia sp.* such as *P. pullulans*, *Penicillioum sp.* such as *P. luteum*, *Chaetomium sp.* such as *C. globosum*, *Trichoderma sp.* such as *T. viride*, *Rhizoctonia sp.* such as *R. solani*. Such bacteria and/or fungi commonly are found on cereal and grain products, on oils, on fruits and vegetables and on cosmetics, leather, electrical insulation, textiles and numerous other materials capable of supporting their growth. Also, such bacteria and/or fungi may be found on plants, seeds, fur and wood and in soils. Further, they may be used to control overgrowth of algae such as *Chlorella sp.* including *C. pyrenoidosa*.

The 2-halo-2-halomethylglutaronitriles of this invention, conveniently, may be prepared from 2-methyleneglutaronitrile, a compound commercially available, by halogenation. The halogenation may be effected by intimately contacting the 2-methyleneglutaronitrile with halogen, chlorine or bromine, preferably at temperatures below about 30° C. and in the absence of a solvent. The addition of halogen to the reaction mixture is continued until an equimolar quantity of halogen is absorbed which usually requires from about 8 to about 72 hours. Where the 2-halo-2-halomethyl glutaronitrile so formed is a liquid, it may be purified by distillation under reduced pressure. If solid, the product may be recovered by solvent extraction followed by evaporation of the solvent and conventional recrystallization of the crude residue.

Alternatively, the halogenation of the 2-methyleneglutaronitrile may be carried out in the presence of a suitable organic solvent such as methylene chloride, hexane, benzene, carbon disulfide, carbon tetrachloride, ethyl acetate and the like. The reaction usually is carried out with the reaction temperature maintained below about 30° C. using external cooling. Upon absorption of an equimolar quantity of halogen, the reaction products may be recovered as indicated above.

It will be understood that the 2-halo-2-halomethylglutaronitriles described above may be used in diverse formulations, solid, including finely divided powders and granular materials as well as liquid, such as solutions, emulsions, suspensions, concentrates, emulsifiable concentrates, slurries and the like, depending upon the application intended and the formulation media desired. Further, when the 2-halo-2-methylglutaronitrile is liquid, it may be employed neat or may be incorporated into various formulations, both solid and liquid, as an adsorbate on suitable inert carriers such as talc, clays, diatomaceous earth and the like.

Thus, it will be appreciated that the 2-halo-2-halomethylnitrile may be employed to form antimicrobial formulations containing such compounds as the essential active ingredient, which formulations may also contain a variety of carrier materials adaptable to industrial and agricultural applications including finely divided dry or liquid diluents, extenders, clays, diatomaceous earth, talc and the like, or water and various organic liquids such as loweralkanols, kerosene, benzene, toluene and other petroleum distillate fractions or mixtures thereof.

It will be understood also that the active 2-halo-2-halomethylglutaronitriles described above may be used in combination one with the other as well as with other antimicrobial materials. For example, these compounds can be combined with other fungicides and bactericides such as 2-(4′-thiazolyl)benzimidazole, sorbic acid, propionic acid, mycostatin, sodium diacetate, trichomycin, amphotericin, griseofulvin, undecylenic acid, esters of parahydroxybenzoic acid, chlorguinaldol, 5,7-dichloro-8-hydroxyquinoline, sodium-o-phenylphenate, o-phenylphenol, biphenyl chlorinated phenols, sodium benzoate in appropriate concentrations and in appropriate instances so as to combine the action of each to obtain particularly useful results. Such combinations might find particular application in the preparation of germicidal soaps, in the production of cosmetics and aqueous coatings and in combatting paper mill slime accumulations. It is quite clear also that the 2-halo-2-halomethyl glutaronitriles can be combined with other algicidal agents such as benzalkonium chlorides and other quaternary ammonium compounds to obtain formulations particularly suitable to special problems of algae control.

As noted above, it has been found that growth of various harmful fungi and bacteria existing in soil is eliminated or limited by use of formulations containing the 2-halo-2-halomethylglutaronitriles described herein. The term, soil, as used here is intended to include all media capable of supporting growth of plants and may include humus, sand, manure, compost, artificially created plant growth solutions and the like.

The 2-halo-2-halomethylglutaronitriles described above have activity against bacteria, fungi and algae when employed at appropriate levels of concentration and may be used to inhibit growth of these organisms. It will be obvious to those skilled in the art that the required effective concentration will vary with particular organisms and in particular applications. In general, however, effective fungicidal, bactericidal and algicidal response is obtained when the 2-halo-2-halomethylglutaronitriles are employed in concentrations ranging between 0.5 and 1000 p.p.m. (parts per million).

The best mode contemplated by applicants for carrying out their invention is more fully illustrated in the following examples; no limitation however, being intended except as set forth in the appended claims.

EXAMPLE 1

2-Chloro-2-chloromethylglutaronitrile

Place 106 gm. of 2-methyleneglutaronitrile in a flask fitted with a stirrer, a calcium chloride drying tube and a subsurface gas inlet tube. Cool to 15–20° C. and add chlorine gas with agitation at such rate that the temperature does not exceed 20° C. When an equimolar quantity of chlorine is absorbed, cease addition of chlorine gas and continue stirring for an additional hour. Purify the product by distillation under reduced pressure to obtain 2-chloro-2-chloromethylglutaronitrile (b.p. 136–138 at 1.5 mm.).

EXAMPLE 2

2-Bromo-2-bromomethylglutaronitrile

Combine 106 gm. of 2-methyleneglutaronitrile and 160 gm. of liquid bromine and stir at a temperature of 25–27° C. for 72 hours. Treat the reaction mixture with aqueous sodium bisulfite and extract with three 100 ml. portions of ethyl ether. Wash the ether extracts with three 50 ml. portions of aqueous sodium bicarbonate and dry with anhydrous magnesium sulfate. Remove the magnesium sulfate by filtration and evaporate the ether. Purify the crude residue by recrystallization from isopropanol to obtain 2-bromo-2-bromomethylglutaronitrile. (m.p. 51.2–52.5° C.).

EXAMPLE 3

2-Bromo-2-bromomethylglutaronitrile

Add 424.5 gm. of 2-methyleneglutaronitrile in 400 ml. of methylene chloride to a 3 l., 3-neck round bottom flask equipped with stirrer, thermometer, condenser and dropping funnel. Add 639.3 gm. of bromine in 400 ml. of methylene chloride to the dropping funnel. Cool the methyleneglutaronitrile solution with stirring to 15° C. on a ice bath. Add bromine solution dropwise to reaction flask over approximately 1.5 hours maintaining reaction temperature at 15–20° C. Age with stirring at 20° C. for three hours and continue stirring at room temperature for 60–70 hours. Distill off solvent under vacuum at about 40° C. maintaining constant volume by continual addition of ethanol. Cool alcohol solution to −4° C. and separate product by filtration. Wash filter cake with cold alcohol and dry under vacuum. Recrystallize from ethanol to obtain 2-bromo-2-bromomethylglutaronitrile.

EXAMPLE 4

In order to determine antimicrobial spectrum, the following techniques are employed:

Antibacterial Activity.—A stock solution of the sample to be tested is prepared in 25% methanol. Dilutions of the stock solution are made into Tryptone Glucose Extract Agar (Difco) and the agar is poured into sterile petri dishes. After hardening, the plates are streaked with an aqueous suspension of the test organism. The inoculated plates are incubated at 35–37° C. and examined after twenty-four hours for the presence or absence of growth. The lowest concentration at which no growth occurred is reported as the "Inhibiting Concentration."

Antifungal Activity.—A stock solution of the sample to be tested is prepared in 25% methanol. Dilutions of the stock solution are made into Sabouraud Maltose Agar (Difco) and the agar is poured into sterile petri dishes. After hardening, the plates are streaked with an aqueous spore suspension of the test organism. No wetting agent is used in preparation of the suspension. The inoculated plates are incubated at 28–30° C. and examined after seven days for the presence or absence of growth. The lowest concentration at which no growth occurred, is reported as the "Inhibiting Concentrations."

Employing the techniques described above, 2-bromo-2-bromomethylglutaronitrile was tested at 1, 10, 50 and 100 p.p.m. against the organisms, and with the results, indicated in the following table.

TABLE I

| Organism: | Inhibiting concentration (p.p.m.) |
|---|---|
| Bacteria: | |
| Aerobacter aerogenes | 50 |
| Bacillus mycoides | 10 |
| Pseudomonas aeruginosa | 50 |
| Staphylococcus aureus | 50 |
| Escherichia coli | 10 |
| Cellulomonas biazotea | 10 |
| Proteus mirabilis | 10 |
| Fungi: | |
| Saccharomyces cerevisiae | 50 |
| Rhodotorula sp. | 100 |
| Alternaria sp. | 100 |
| Aspergillus niger | 100 |
| Pullularia pullulans | 100 |
| Penicillium luteum | 100 |
| Chaetomium globosum | 100 |
| Trichoderma viride | 100 |
| Rhizoctonia solani | 50 |

EXAMPLE 5

2-Bromo-2-bromomethyleneglutaronitrile was tested for its bactericidal activity by the time-kill method. The test consists of inoculating a culture of *Aerobacter aerogenes* into sterile water, adding known concentrations of the test chemical, and allowing the two to remain in contact for a known period of time. Bacterial counts are run after the alloted contact time. The effectiveness of the test chemical is determined by comparing the counts to a control count containing only sterile water and the bacteria taken at 0 hours. Results of the test are summarized in the following table.

TABLE II

| Compound | Concentration (p.p.m.) | Contact time (hrs.) | Kill (percent) |
|---|---|---|---|
| 2-bromo-2-bromomethylglutaronitrile. | 25 | 3 | 91 |
|  | 20 | 3 | 86 |
|  | 10 | 3 | 82 |
|  | 5 | 3 | 74 |
|  | 1 | 3 | 75 |

EXAMPLE 6

The effectiveness of 2-bromo-2-bromomethyleneglutaronitrile as a paper mill slime control agent was evaluated by the following technique.

An artificial paper mill white water is prepared consisting of the following in tap water:

| | Percent |
|---|---|
| TAPPI Standard Sulfite Pulp—Technical Association of the Pulp and Paper Industry, New York | 0.05 |
| Trypticase Soy Broth, Sterile | 0.05 |
| Saturated Alum Solution—to pH 4.5. | |
| *Aerobacter aerogenes* suspension | 0.1 |

Aliquots (100 ml.) of the white water are placed in oversized containers suitable for use on a shaker (e.g., bottles, flasks). Test compound is added to these aliquots to produce the desired test concentrations. An uninhibited control is included in each test. Plate counts are run on the uninhibited at zero time and on the treated aliquots at 1 hour, 4 hours and 24 hours after the start of the test. The percentage reduction in the count for each inhibitor level and at each time interval is calculated by comparing the bacterial population of each sample with that of the uninhibited control. To be considered of value the percent reduction achieved by the test compound must be at least 90%, and preferably 99%, within four hours. The results of this experiment using 2-bromo-2-bromomethyleneglutaronitrile are summarized in the following table.

TABLE III

| Compound | Concentration (p.p.m.) | Reduction (percent) after— | | |
|---|---|---|---|---|
| | | 1 hr. | 4 hrs. | 24 hrs. |
| 2-bromo-2-bromomethylglutaronitrile | 50 | 99.99 | 99.99 | 99.99 |
| | 25 | 99.99 | 99.99 | 99.99 |
| | 10 | 99.0 | 99.9 | 99.99 |
| | 5 | | 99.0 | 99.99 |
| Control (bacteria/ml.) | | $49 \times 10^6$ | $1.1 \times 10^8$ | $3 \times 10$ |

EXAMPLE 7

The efficacy of 2-bromo-2-bromomethylglutaronitrile as a preservative for paints during storage, both alone and in the presence of an added mildewcide, 2-(4'-thiazoly)benzimidazole, was evaluated by the following method.

Exterior polyvinyl acetate and interior acrylic paints having the formulas indicated in Tables IV and V were prepared for testing.

TABLE IV.—PVA EXTERIOR (COMPOSITION—PARTS BY WEIGHT)

| | 1 | 2 | 3 | 4 | 5 | 6 | 7 | 8 | 9 | 10 |
|---|---|---|---|---|---|---|---|---|---|---|
| Cowles dispenser: | | | | | | | | | | |
| Water | 140 | 140 | 140 | 140 | 140 | 140 | 140 | 140 | 140 | 140 |
| Daxed 30, Na salt of polymerized carcoxylic acid, W. R. Grace Co | 6 | 6 | 6 | 6 | 6 | 6 | 6 | 6 | 6 | 6 |
| Potassium tripolyphosphate | 1 | 1 | 1 | 1 | 1 | 1 | 1 | 1 | 1 | 1 |
| Igepal Co-630, nonylphenoxypoly-(ethyleneoxy)ethanol, General Anile & Film Co | 1.5 | 1.5 | 1.5 | 1.5 | 1.5 | 1.5 | 1.5 | 1.5 | 1.5 | 1.5 |
| Polyethyleneglycol | 2 | 2 | 2 | 2 | 2 | 2 | 2 | 2 | 2 | 2 |
| Methylcellulose solution (3%) | 70 | 70 | 70 | 70 | 70 | 70 | 70 | 70 | 70 | 70 |
| Defoamer | 1 | 1 | 1 | 1 | 1 | 1 | 1 | 1 | 1 | 1 |
| 2-bromo-2-bromomethylglutaronitrile (DBGN) | 0 | 1.1 (0.1%) | 2.75 (0.25%) | 1.1 (0.1%) | 0.55 (0.05%) | 0.825 (0.075%) | 0.0275 (0.025%) | 0.55 (0.05%) | 0.825 (0.05%) | 1.1 (0.1) |
| 2(4'-thiazolyl)benzimidazole(TBZ) | 0 | 1.1 (0.1%) | 1.1 (0.1%) | 2.75 (0.25%) | 2.75 (0.25%) | 2.75 (0.25%) | 0 | 0 | 0 | 0 |
| Titanium dioxide | 250 | 250 | 250 | 250 | 250 | 250 | 250 | 250 | 250 | 250 |
| Disperse ten minutes at 4,800 r.p.m. | | | | | | | | | | |
| Talc | 75 | 75 | 75 | 75 | 75 | 75 | 75 | 75 | 75 | 75 |
| Disperse ten minutes at 4,800 r.p.m. | | | | | | | | | | |
| Reduction: | | | | | | | | | | |
| Methylcellulose solution 3%) | 68.5 | 68.5 | 68.5 | 68.5 | 68.5 | 68.5 | 68.5 | 68.5 | 68.5 | 68.5 |
| Methyl carbitol | 20 | 20 | 20 | 20 | 20 | 20 | 20 | 20 | 20 | 20 |
| Ethylene glycol | 40 | 40 | 40 | 40 | 40 | 40 | 40 | 40 | 40 | 40 |
| Polyvinyl acetate emulsion | 425 | 425 | 425 | 425 | 425 | 425 | 425 | 425 | 425 | 425 |

TABLE V.—INTERIOR ACRYLIC (COMPOSITION—PARTS BY WEIGHT)

| | 1 | 2 | 3 | 4 | 5 | 6 | 7 | 8 | 9 | 10 |
|---|---|---|---|---|---|---|---|---|---|---|
| Cowles disperser: | | | | | | | | | | |
| Water | 450 | 450 | 450 | 450 | 450 | 450 | 450 | 450 | 450 | 450 |
| Diethylene glycol [1] | 30 | 30 | 30 | 30 | 30 | 30 | 30 | 30 | 30 | 30 |
| Methylcellulose, 4,000 cps.[1] | 5 | 5 | 5 | 5 | 5 | 5 | 5 | 5 | 5 | 5 |
| Potassium tripolyphosphate | 1.66 | 1.66 | 1.66 | 1.66 | 1.66 | 1.66 | 1.66 | 1.66 | 1.66 | 1.66 |
| Lecithin | 4 | 4 | 4 | 4 | 4 | 4 | 4 | 4 | 4 | 4 |
| Defoamer | 3 | 3 | 3 | 3 | 3 | 3 | 3 | 3 | 3 | 3 |
| 2-bromo-2-bromomethylglutaronitrile (DBGM) | 0 | 1.08 (0.1%) | 2.7 (0.25%) | 1.08 (0.1%) | 0.54 (0.05%) | 0.81 (0.075%) | 0.27 (0.025%) | 0.54 (0.05%) | 0.81 (0.075%) | 1.08 (0.1%) |
| 2-(4'-thiazolyl)benzimidazole (TBZ) | 0 | 1.08 (0.1%) | 1.08 (0.1%) | 2.7 (0.25%) | 2.7 (0.25%) | 2.7 (0.25%) | 0 | 0 | 0 | 0 |
| Titanium dioxide | 125 | 125 | 125 | 125 | 125 | 125 | 125 | 125 | 125 | 125 |
| Disperse ten minutes at 4,800 r.p.m. | | | | | | | | | | |
| Talc | 250 | 250 | 250 | 250 | 250 | 250 | 250 | 250 | 250 | 250 |
| Calcium silicate | 5 | 5 | 5 | 5 | 5 | 5 | 5 | 5 | 5 | 5 |
| Disperse ten minutes at 4,800 r.p.m. | | | | | | | | | | |
| Reduction: Acrylic resin emulsion | 208 | 208 | 208 | 208 | 208 | 208 | 208 | 208 | 208 | 208 |

[1] Premix diethylene glycol and methylcellulose prior to adding to water.

Aliquots of each paint sample are placed in sterile containers. Each sample is streaked on the surface of plates of Tryptone Glucose Extract Agar (TGE) to check its bacterial condition. Bacteria free samples are then inoculated with a twenty-four hour old broth culture of *Pseudomonas aeruginosa* ATCC 10145 (American Type Culture Collection) at the rate of 1 ml. of culture per 100 gm. of sample. The inoculated samples are incubated at 28-30° C. The microbiological condition of each sample is checked after 24, 48, 72 hours and seven days by streaking on the surface of TGE plates. These plates are incubated at 28-30° C. for seven days and examined for growth. Seven days after the first inoculation samples are reinoculated with *P. aeruginosa* ATCC 10145 and streaked on TGE at 24, 48, 72 hours and seven days after reinoculation. Samples which achieve sterility within 48 hours after inoculation and reinoculation, and which are still sterile seven days after inoculation and reinoculation, are considered to be adequately preserved. The results achieved with the test samples indicated above are summarized in Table VI.

TABLE VI

| Sample number: | DBGN percent [1] | TBZ, percent [2] | PVA Inoculation | PVA Reinoculation | Acrylic Inoculation | Acrylic Reinoculation |
|---|---|---|---|---|---|---|
| 7 | 0.025 | 0 | 48 | 48 | 24 | 72 |
| 8 | 0.05 | 0 | 48 | 48 | 24 | 24 |
| 9 | 0.075 | 0 | 24 | 24 | 24 | 24 |
| 10 | 0.1 | 0 | 24 | 24 | 24 | 24 |
| 5 | 0.05 | 0.25 | 24 | 24 | 24 | 24 |
| 6 | 0.075 | 0.25 | 24 | 24 | 24 | 24 |
| 4 | 0.1 | 0.25 | 24 | 24 | 24 | 24 |
| 2 | 0.1 | 0.1 | 24 | 24 | 24 | 24 |
| 3 | 0.25 | 0.1 | 24 | 24 | 24 | 4 |
| 1 | 0 | 0 | Complete degradation | | | |

[1] DBGN=2-bromo-2-bromomethylglutaronitrile.
[2] TBZ=2-(4'-thiazolyl)benzimidazole.

EXAMPLE 8

2-Bromo-2-bromomethylglutaronitrile was tested for algicidal properties employing the following technique:

An actively growing culture of *Chlorella sp.* is prepared in a modified Allen's Liquid Media. Varying concentrations of the chemical to be tested are added to 50 ml. portions of the culture. Each sample then is incubated at 22° C. for 2-weeks. Each sample during the test period is illuminated with a fluorescent lamp source providing 50 foot candles at base of each flask. The lamp is on 16 hours and off 8 hours during each day of the incubation period. At the end of the test period, each sample is examined microscopically for algae growth. The results of this experiment are summarized in the following table.

TABLE VII

| DBGN* concentration (p.p.m.): | Microscopic examination |
|---|---|
| 3000 | All cells dead. |
| 2000 | Do. |
| 1000 | Do. |
| 800 | Do. |
| 600 | Do. |
| 400 | Do. |
| 200 | 50% cells dead, 50% same as control. |
| (p.p.m.): | Microscopic examination |

* DBGN—2-Bromo-2-bromomethylglutaronitrile.

EXAMPLE 9

In order to evaluate the effectiveness of 2-bromo-2-bromomethylglutaronitrile against sulfate reducing bacteria, both in fresh water and in brine, the following technique was employed:

Organism—*Desulfovibrio desulfuricans* (Midcontinent strain A—Department of Biology, University of Houston, Houston, Tex.)

The bacteria are grown in a sterile nutrient media containing sodium lactate, yeast extract, magnesium sulfate, ferrous ammonium sulfate and other ingredients as described in American Petroleum Institute Booklet RP-38, 2nd Ed. (1965) under the title "Recommended Practice for Biological Analysis of Subsurface Injection Waters."

*Fresh Water.*—The bacterial inoculum is mixed with growth media in the ratio of 10 ml./500 ml. One volume of this then is added to sterile screw-cap tubes and mixed with en equal volume of a solution containing the test chemical at twice the desired test concentration. The tubes are then filled to overflow with additional test mixture in order to exclude air. Each sample is incubated at 35° C. for three weeks and examined for growth of bacteria. Growth of bacteria is easily noted by the formation of black ferrous sulfide from bacterially produced hydrogen sulfide and ferrous salts.

*Brine.*—For tests in brine the nutrient medium and assay medium are modified by the addition of sodium chloride to give an approximate chloride concentration of 15,000 p.p.m.

The results of this experiment are summarized in the following table:

TABLE VIII

| DBGN [1] concentration (p.p.m.) | Fresh water | Brine |
|---|---|---|
| 50 | No growth | No growth. |
| 25 | Ferrous sulfide visible | Do. |
| 10 | do | Do. |
| 5 | do | Ferrous sulfide visible. |
| 1 | do | Do. |

[1] DBGN=2-bromo-2-bromomethylglutarontrile.

What is claimed is:
1. A method of controlling the growth of bacteria or fungi which comprises contacting said bacteria or fungi with a bactericidally or fungicidally effective amount of 2-bromo-2-bromomethylglutaronitrile.

References Cited
FOREIGN PATENTS 379,999  1/1962  Japan _____ 260—465.7
189,827  12/1966  U.S.S.R. _____ 260—465.7

OTHER REFERENCES

Kondratenko et al: Chem Abst., Vol. 68 (1968), p. 12440k.

JEROME D. GOLDBERG, Primary Examiner
A. J. ROBINSON, Assistant Examiner

U.S. Cl. X.R.
71—67; 260—465.7